May 19, 1959  B. H. WOLF  2,887,578
AUTOMATIC RANGE SEARCH-RANGE INTEGRATOR CIRCUIT
FOR AUTOMATIC TRACKING RADAR RANGE
UNITS AND OTHER APPLICATIONS
Filed March 16, 1956
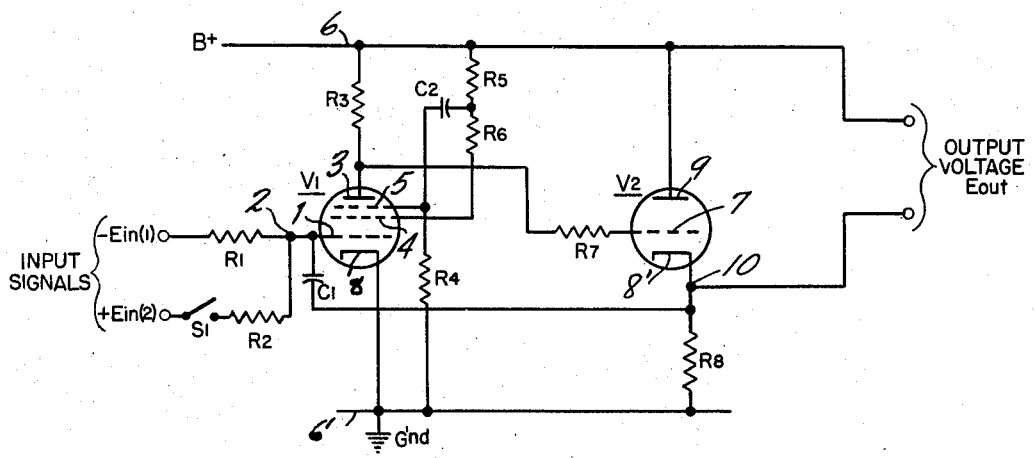

United States Patent Office 2,887,578
Patented May 19, 1959

2,887,578

AUTOMATIC RANGE SEARCH-RANGE INTEGRATOR CIRCUIT FOR AUTOMATIC TRACKING RADAR RANGE UNITS AND OTHER APPLICATIONS

Bertram H. Wolf, Westfield, N.J., assignor to Stavid Engineering, Inc., Plainfield, N.J., a corporation of New Jersey Application March 16, 1956, Serial No. 572,010

2 Claims. (Cl. 250—27)

The invention described herein may be manufactured and used by or for the Government of the United States of America for governmental purposes without the payment of any royalties thereon or therefor.

This invention relates to an improved automatic range search-range integrator circuit for automatic tracking radar range units. More particularly the invention relates to a circuit wherein the output voltage is the instantaneous value of a linear repetitive voltage and is the time integral of its input.

With the advent of small mass, high velocity targets such as jet planes and missiles the detection and tracking problem for pulsed radar has increased. Automatic tracking radar must "lock on" the target and follow it in azimuth, and its range circuits must take a rapidly varying range rate and integrate it to result in an output voltage proprotional to range. With targets already traveling at speeds over Mach 1 it can be seen that range solutions must be instantaneous if it is desired to know their exact position for purposes of control or interception.

The increase in air traffic has particularly made it essential that the exact position of aircraft be known when under control of the tower and in the final approaches under the direction of a Ground Control Approach unit. In these latter situations the range is short and a high order of resolution must be incorporated into the radar equipment. River and seaport traffic control in bad weather requires great accuracy in range determination of the targets being controlled. Ships and ferrys entering slips must have accurate determination of distance when on short scale ranging. It is anticipated that radar can be used to automatically and progressively apply the brakes on a car for the driver when his car approaches another. This latter application will require the highest order of range resolution and the quickest of range or distance determination.

Faster moving targets and the use of radar for short distance ranging has increased the need for fast accurate range resolution. Since range resolution of a radar set is determined by the duration of the transmitted pulse it is now necessary that the duty ratio—the ratio of pulse duration to repetition period—and consequently the repetition period of radar must be decreased. Such a decrease means that the associated circuitry must determine the range faster and more accurately in order to keep the problem solution current.

Modern day computers used in the solution of complex problems have been improved to the extent that problem solutions are made in a short time. In such devices control circuits, resulting from input data, of very high accuracy must be employed to convert voltage into a dial reading or a mechanical result. This invention will also find application in such devices.

Modern day radar still does not have the range resolution of the highest order as required in the situation discussed above. One of the problems has been the slowness of the range circuitry in arriving at range solutions. This invention provides a simple circuit capable of fast and accurate range solutions. Most range units perform integration and oscillation with different elements while this invention combines them in one. The dependability of circuitry is usually increased if the number of circuit elements is reduced, particularly if they are tubes.

It is a principal object of this invention to provide a simple and dependable circuit capable of instantaneous, accurate and current range determination from a rapidly varying range rate.

It is another object of the invention to provide a circuit applicable to situations where it is desired to record and remember the instantaneous value of a linear repetitive voltage.

Another object is to provide a circuit capable of acting as an integrator and a relaxation oscillator.

It is a further object of the invention to provide a D.C. integrator with internal self-gating of the suppressor grid from the screen grid so that the circuit can be caused to start or stop a sawtooth relaxation oscillation as a function of the position of a switch means.

Other objects appear throughout the specification.

In describing the invention, reference is had to the accompanying drawing which comprises a circuit diagram of a circuit in accordance with the invention.

In the drawing there is shown one application of the invention as an Automatic Range Search Range Integrator Circuit of a radar set, and more particularly of the automatic range unit. The circuit comprises a pentode $V_1$ having a varying direct-current potential or negative input voltage $E_{in}$ (1) and a direct-current potential or positive voltage $E_{in}$ (2) applied to its control grid 1 through a connection 2. The latter input voltage is turned off and on by switch S. The input voltage circuits are provided respectively with resistors $R_1$ and $R_2$ of which resistor $R_1$ has a much greater value than resistor $R_2$. The plate 3 of the pentode $V_1$ is connected to a B+ line 6 through a resistor $R_3$ and its cathode 8 is connected to line 6' and grounded. The screen grid 4 and the suppressor grid 5 are coupled and the latter is connected with series resistors $R_4$, $R_5$, $R_6$ and a condenser $C_2$ connected in parallel with two of the resistors $R_4$, $R_6$ is also connected to the suppressor grid 5 so as to provide internal self-gating of the suppressor grid 5 from the screen grid 4. The resistor $R_5$, capacitor $C_2$ and resistor $R_4$ comprise a voltage divider network coupled in series between the source of B+ potential and the ground source of constant pontential. Thus the potential on suppressor grid 5 is derived from a point on the voltage divider between capacitor $C_2$ and resistor $R_4$ which will normally be at ground potential. The circuit includes a cathode follower branch circuit comprising a triode $V_2$ having its control grid 7 connected to the plate 5 of the pentode $V_1$ through resistor $R_7$ and its cathode 8' connected through a resistor $R_8$ to the same line 6' that the cathode of the pentode $V_1$ is connected. The cathode 8' is connected ahead of the resistor 8 through an integrating capacitor or condenser $C_1$ to the control grid 1 of the pentode $V_1$. The plate 9 of the triode $V_2$ is connected to the B+ line 6. The output voltage E out connection 10 is immediately adjacent the cathode 8' of the triode $V_2$.

The circuit shown in the drawing combines in one tube ($V_1$), the functions of a D.C. integrator and a relaxation oscillator. In this application, it provides a sawtooth output waveform (whose frequency is determined by the values of $E_{in}$ (2), $R_2$, $C_1$ and the other parameters of the circuit), to drive the tracking gates of an automatic range unit during range search. It further acts as a D.C. integrator to integrate the voltage $E_{in}$ (1) (which is proportional to range rate) so as to result in an output voltage, $E_{out}$, which is proportional to range, during the automatic range-tracking mode of operation of the ranging circuits. The circuit, however, may be applied in any application where it is desired to record and remember the instantaneous value of a linear repetitive voltage. As such the circuit may find application in analogue computers, timing devices and similar equipment.

The branch circuits associated with tube $V_1$ can be considered to be a high gain D.C. amplifier, provided with negative feedback from plate to grid through capacitor $C_1$. As such, it comprises a D.C. integrator of the Miller type, and its output, $E_{out}$, is the time integral of its input, $E_{in}(1)$. However, one of the novel features of the circuit shown above is the addition of internal self-gating of the suppressor grid 5 from the screen grid 4, via resistors $R_5$, $R_6$ and $R_4$ and capacitor $C_2$, so that the circuit can be caused to start or stop a sawtooth relaxation oscillation as a function of the position of switch, $S_1$.

Another novel feature of this circuit is the method of taking negative feedback from the plate to the grid of $V_1$ through $C_1$. Cathode follower $V_2$ is included so that the output voltage of the circuit, $E_{out}$, is taken at low impedance. However, by taking the capacitative plate-to-grid feedback for $V_1$ (via capacitor $C_1$) from the output of cathode follower $V_2$, the non-linearity of the cathode follower is eliminated insofar as the operation of the circuit is concerned, and the low driving point impedance of the cathode follower permits $C_1$ to be charged rapidly, thus enabling the circuit to perform a relaxation oscillation at higher frequencies. It will be understood that the function of the cathode follower is to change the recharging time constant of the circuit and particularly to shorten the restoration or recovery time. Accordingly for applications where a high repetition frequency of the sawtooth voltage is unnecessary the cathode follower may be omitted.

The operation of this circuit is as follows:

(a) As a D.C. integrator

Switch $S_1$ is left open and hence $E_{in}(2)$ cannot act to control the circuit. Input $E_{in}(1)$ is, in general, a negative voltage varying or fluctuating above and below a fixed negative value of about $-10$ v. Tube $V_1$ is adapted to provide a voltage gain of about 100 or 200 times. As $E_{in}(1)$ varies, the plate potential of $V_1$ will rise and fall. The rate of change of this plate potential is essentially dependent on the constants $R_1$ and $C_1$, and, if the gain of $V_1$ is high (greater than 100 times), this plate potential will be accurately proportional to the time integral of the voltage $E_{in}(1)$. The basic theory of the operation of electronic D.C. integrators is contained in many reference texts.

(b) As a sawtooth oscillator

The D.C. integrator is caused to act as a relaxation oscillator by the addition of internal self-gating of the suppressor grid from the screen grid with the components $R_4$, $R_5$, $R_6$ and $C_2$, so as to obtain a negative resistance by the transitron principle. The circuit will commence a sawtooth oscillation when the switch $S_1$ is closed. $E_{in}(2)$ is a positive voltage which is applied suddenly to the control grid of $V_1$ when $S_1$ is closed. With a positive step input applied to its control grid, the plate potential of $V_1$ begins to fall at a linear rate (rundown), due to its action as an integrator. The plate current of $V_1$ remains essentially constant during the plate voltage rundown until the knee of its pentode plate ($e_b$—$i_b$) characteristic is reached, at which time the value of its plate current drops. This latter action results in a rising screen grid current, a falling screen grid voltage and a falling suppressor grid voltage, due to the fact that the suppressor is coupled to the screen through $C_2$. The drop in suppressor voltage further reduces the plate current. This condition remains while capacitor $C_1$ is being charged through $V_2$. As $C_1$ charges, the plate potential of $V_1$ rises, and a point is reached at which the plate of $V_1$ commences to draw current which would otherwise pass to the screen. The suppressor grid potential therefore rises once more, since the suppressor and screen are coupled, until the plate of $V_1$ takes a large current, thus discharging capacitor $C_1$. The cycle is then repeated, and results in a sawtooth waveform output at the plate of $V_1$ or at the cathode of $V_2$, as long as switch $S_1$ remains closed.

If $S_1$ is suddenly opened at any point during the linear run-down, the circuit will stop oscillating and "remember" the value of the voltage at the plate of $V_1$ just prior to the instant of opening $S_1$. This memory will continue indefinitely, limited only by leakage currents in the circuit. Should switch $S_1$ be closed again, while the circuit is in the "memory" condition, the plate of $V_1$ will begin its run-down at the value of the voltage previously remembered and will continue to run-down until it "bottoms," before recycling.

Resistor $R_2$ is given a value considerably smaller than $R_1$, so that with $S_1$, $E_{in}(2)$ will govern the potential of the control grid of $V_1$ and any changes of $E_{in}(1)$ during the same time will have negligible effect on the circuit.

It will be seen from the foregoing description that the present invention provides a simple circuit which can integrate and oscillate as required and may be applied in situations where it is desired to record and remember instantaneous voltage values.

While the invention has been described with reference to a particular circuit, it will be understood that it is equally applicable to other uses and is in no way limited to the particular embodiment herein shown and described.

What I claim and desire to secure by Letters Patent is:

1. A circuit arrangement for integrating a fluctuating negative potential or alternatively generating a periodic linear sawtooth voltage in response to a positive potential comprising: a source of first and second unidirectional potentials, the said first potential corresponding to a variable direct-current negative potential and the second potential corresponding to a direct-current positive potential; a first space-discharge device including control, screen, suppressor, and output elements, and a second space-discharge device having at least output, control and electron-discharge elements; a source of direct current power-supply voltage; means coupling the said first and second space-discharge devices in parallel between said power-supply voltage source and a source of constant potential, the said coupling means including a first load-impedance component connected between the said power-supply source and the output element of the said first device, and a second load-impedance component connected between the said electron-discharge element of said second device and the said source of constant potential; means including an integrating capacitor intercoupling the said electron-discharge element and the control element of the said first space-discharge device; means connecting the control element of the said second space-discharge device to the output of the said first device; a voltage divider coupled between the said supply-power voltage source and the said source of constant potential including; means comprising a speedup capacitor intercoupling the said screen and suppressor elements; means applying the said first unidirectional potential to the control element of the said first device; and means including a switch for applying the said second unidirectional potential to the control element of the said first device.

2. A single-stage, electron-tube circuit for integrating a fluctuating negative potential or, alternatively generating a periodic linear sawtooth voltage in response to a positive potential comprising: a high-gain, sharp-cutoff tube including plate, suppressor, screen, and control grids; an integrating feedback channel coupled between the plate and the control grid of the tube comprising a cathode follower having output and input circuits, an integrating capacitor, means coupling said input circuit to the plate of the said tube; means coupling the integrating capacitor between the output circuit and the control grid of the tube; a speedup capacitor coupled between the screen and suppressor grids of the tube; a source of fluctuating negative and constant positive potentials; and means for selectively applying said negative and positive potentials to the control grid of the tube to produce an output signal representative of the integral of said negative potential in the first intsance and a respective sawtooth voltage in the second instance.

References Cited in the file of this patent

UNITED STATES PATENTS

| | | |
|---|---|---|
| 2,573,970 | Hinckley et al. | Nov. 6, 1951 |
| 2,651,719 | White | Sept. 8, 1953 |
| 2,695,962 | Nibbe | Nov. 30, 1954 |
| 2,701,841 | Fredrick | Feb. 8, 1955 |
| 2,735,007 | McCurdy | Feb. 14, 1956 |
| 2,775,694 | Blumlein | Dec. 25, 1956 |

FOREIGN PATENTS

| | | |
|---|---|---|
| 588,417 | Great Britain | May 21, 1947 |